Feb. 5, 1957 C. H. MARTIN 2,780,454
WORK CONVEYOR FOR HEAT TREATING FURNACES
Filed Dec. 14, 1953 3 Sheets-Sheet 1
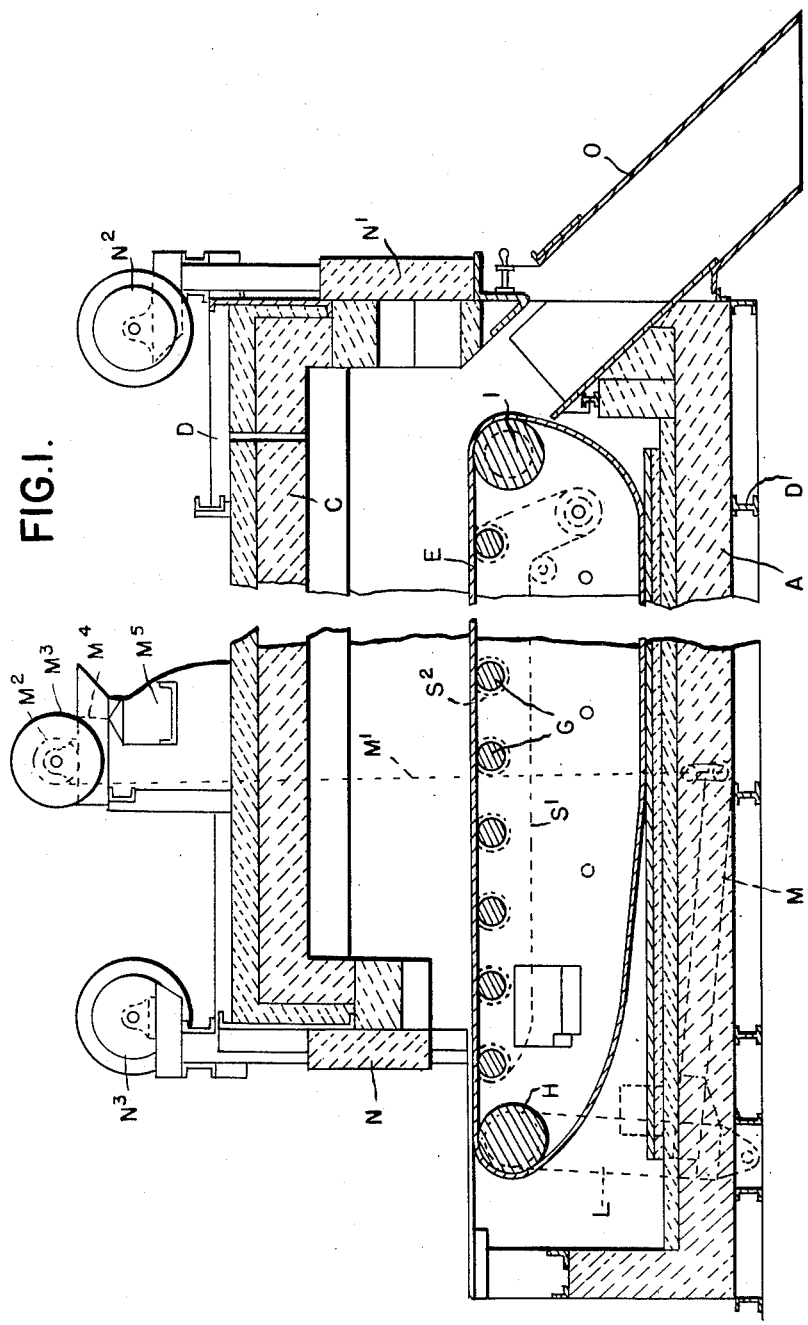
INVENTOR.
CLARENCE H. MARTIN
BY
Whittemore Hulbert & Belknap
ATTORNEYS Feb. 5, 1957 C. H. MARTIN 2,780,454
WORK CONVEYOR FOR HEAT TREATING FURNACES
Filed Dec. 14, 1953 3 Sheets-Sheet 2
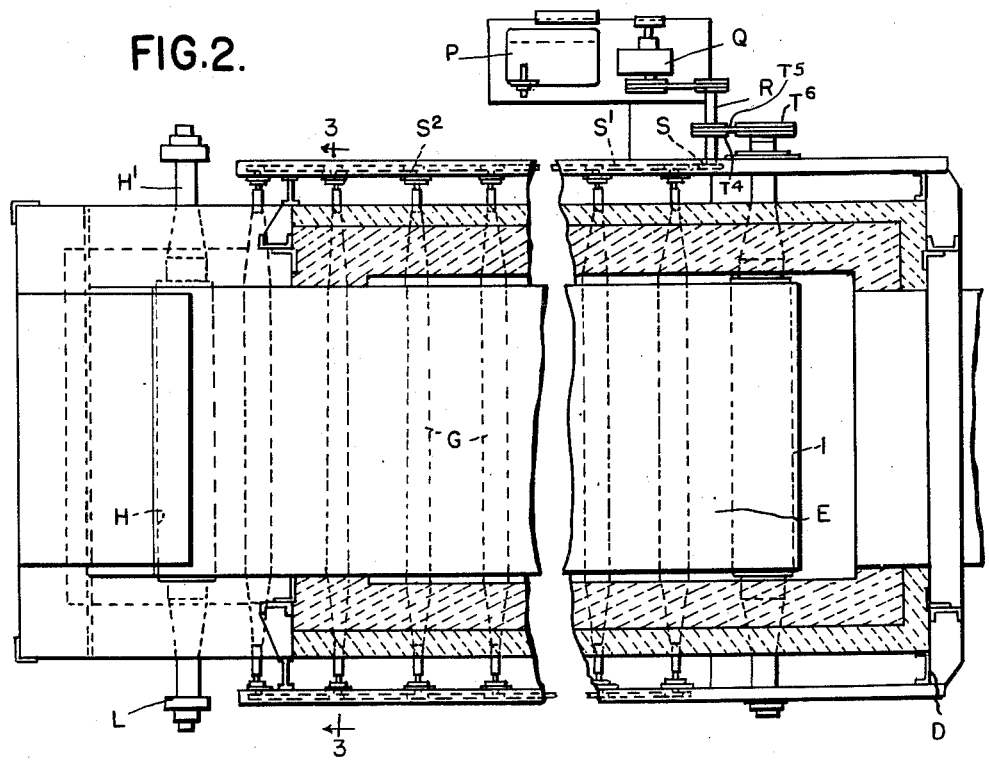
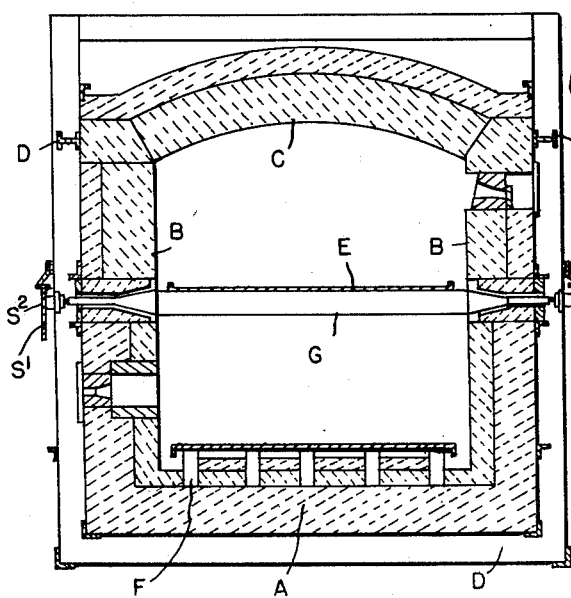
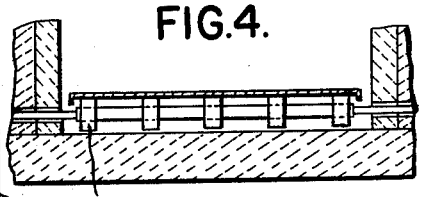
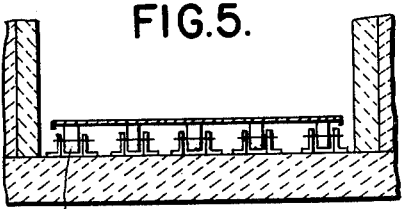
INVENTOR.
CLARENCE H. MARTIN
BY
ATTORNEYS Feb. 5, 1957  C. H. MARTIN  2,780,454
WORK CONVEYOR FOR HEAT TREATING FURNACES
Filed Dec. 14, 1953  3 Sheets-Sheet 3

INVENTOR.
CLARENCE H. MARTIN
BY
*Whittemore Hulbert Belknap*
ATTORNEYS

2,780,454

Patented Feb. 5, 1957

2,780,454

WORK CONVEYOR FOR HEAT TREATING FURNACES

Clarence H. Martin, Delray Beach, Fla., assignor to Holcroft & Company, Detroit, Mich., a corporation of Michigan Application December 14, 1953, Serial No. 397,859

6 Claims. (Cl. 263—8)

The invention relates to work conveying means for use in heat treating furnaces and of that type including an endless belt conveyor. It is the object of the invention to provide driving means for the conveyor which avoids overstressing the belt at any point in its length and which is equally operative whether the conveyor is with or without load.

It is a further object to obtain a construction which is uneffected by varying temperatures in different portions of the furnace chamber and the resulting expansion or contraction of the conveyor elements.

With these objects in view, the invention consists in the construction as hereinafter set forth.

In the accompanying drawings:

Fig. 1 is a longitudinal section through a heat treating furnace showing in connection therewith my improved work conveyor and driving means therefor;

Fig. 2 is a sectional plan view of portions of the furnace;

Fig. 3 is a cross-section on line 3—3, Fig. 2;

Figs. 4 and 5 are cross-sections showing modified constructions for supporting the return portion of the belt;

Figure 7:
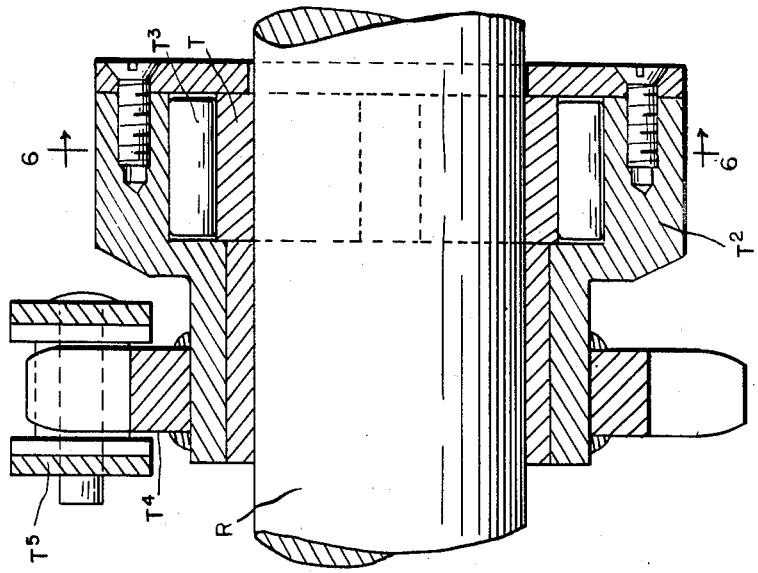
Figs. 6 and 7 are, respectively, a cross-section and a longitudinal section through the driving sprocket of the drum rotating mechanism which permits of the overrunning of the latter, the section of Fig. 6 being on line 6—6, Fig. 7.

The furnace may be of any suitable construction and may be extended to any desired length. As shown it has a base A, side walls B and arched top C, which are reinforced by an external metallic framework D. Within the furnace chamber is a belt conveyor E, the upper portion of which forms the work support extending from outside of the heat treating chamber to a point where the work is discharged and passes out from the furnace.

Belt conveyors of this type are usually provided at their forward and rear ends with drums around which the endless belt passes and intermediate these drums supporting rolls for the upper portion of the belt on which the work is conveyed. In some constructions only the drums are driven, the rolls idling. In other constructions both the drums and rolls are driven. This is usually the case with a long conveyor with the object of avoiding overstressing the belt which might occur if the drum only was driven. It has been found, however, that such constructions do not work satisfactorily for the reason that it is difficult to produce equal driving stress on the belt by the drum and the rolls. This may be partly due to the slippage of the rolls in contact with the belt inasmuch as this contact is only a line with little if any wrapping about the roll. Another difficulty is the uneven temperatures within the heat treating chamber which produces different degrees of expansion in the belt, rolls and drums. Whatever the cause it has been found that the drum and the rolls do not drive equally and one or the other carries the greater part of the load. This may result in overstressing the belt and causing breakage.

As above stated it is the object of the invention to avoid such difficulty and to drive the belt without overstressing any portion thereof both when running with or without load. H and I are drums respectively, located at the work receiving end of the furnace and near the rear end of the heat treating chamber. G are rolls which are in spaced series beneath the upper portion of the belt for holding it in a horizontal plane and supporting the load thereon. The return portion of the belt extends downward from the drum I to be supported on the base A to a point where it passes upward around the drum H. The support for this return portion may be varied according to the length of the furnace and other conditions. As shown in Fig. 3, parallel spaced rails F extending longitudinally of the base A form such support. In Fig. 5 idler rollers J form the support and in Fig. 4 driven rollers K are used. The drum H at the loading end is adjustable to form a belt tensioning means, which, as shown, comprises connected supporting rock arms L pivotally supported at their lower ends and having at their upper ends bearings for the drum shaft H'. An arm M secured to and extending forwardly from near the lower end of one of the rock arms L has attached to its forward end a cable M' extending upward and over a winding drum M². A pulley M³ on this drum has secured thereto a cable M⁴ for suspending a receptacle M⁵ which may be variously loaded. Thus, any desired tension may be placed on the belt by changing the load in the receptacle M⁵. At the work receiving end of the furnace the belt extends outward beyond the heating chamber for loading with the work and a closure N for the furnace chamber is adjustable vertically to provide clearance for the work with the minimum opening. A similar closure N' is arranged at the opposite end of the furnace, both closures being provided with raising and lowering means, as indicated at N² and N³. A discharge chute O extends from adjacent the drum I obliquely downward and out from the furnace.

When the conveyor is fully loaded the friction of the belt on the rolls G is sufficient to do all of the driving provided that these rolls are driven. When, however, the belt is unloaded or is being loaded the friction on the rolls is so reduced as to not be sufficient for driving the belt under the drag of the return portion thereof. However, the drum I has the belt wrapped thereabout for a considerable extent and if this drum is driven it will supplement the rolls to drive the belt whether loaded or unloaded. The difficulty in such construction is, as previously described, that it is practically impossible to proportion the driving of the drum to that of the rolls so as to equally share the load. I have, therefore, devised a driving mechanism for the rolls and drum which overcomes the difficulty, as follows:

P is a motor which drives through the medium of a variable speed reducer Q and a jack-shaft R. On this shaft is a sprocket S which drives a sprocket chain S' extending to successively engage sprockets S² on each of the rolls G. These rolls have reduced end portions which extend out through openings in the side walls B of the furnace and are journalled in bearings mounted on the metallic frame. Thus, all of the rolls will be revolved at the same angular speed and will frictionally drive the portion of the belt resting thereon. The drum I is driven from the same jack-shaft R but at an angular velocity such that its peripheral speed will be slightly less than that of the rolls. However, the driving transmission from the jack-shaft includes a one-way clutch which permits the drum to travel at a higher angular velocity when the belt is driven solely by the rolls. It will, therefore, be apparent that when the belt is fully loaded and the friction of the rolls is high, these alone will be sufficient to do all of the driving and the drum I will idle. When, however, there is slippage of the rolls on the belt to reduce its speed of travel to that of the periphery of the drum, the latter will take hold and furnish the necessary additional force. The rolls will still do a part of the driving but without any interference with the drum. It has been stated that uneven temperatures in the furnace chamber will cause unequal expansion and contraction of the belt, rolls and drums. This might change the driving effect on the belt of individual rolls but this is never sufficient to produce an overstressing of any portion of the belt resting on said rolls. If, however, the drum I were driven at the same peripheral velocity as the rolls it might at times overstress the portion of the belt drawn thereby. Thus, by driving the drum at a lower peripheral velocity and permitting it to overrun when necessary overstressing of the belt is avoided.

Figure 6:
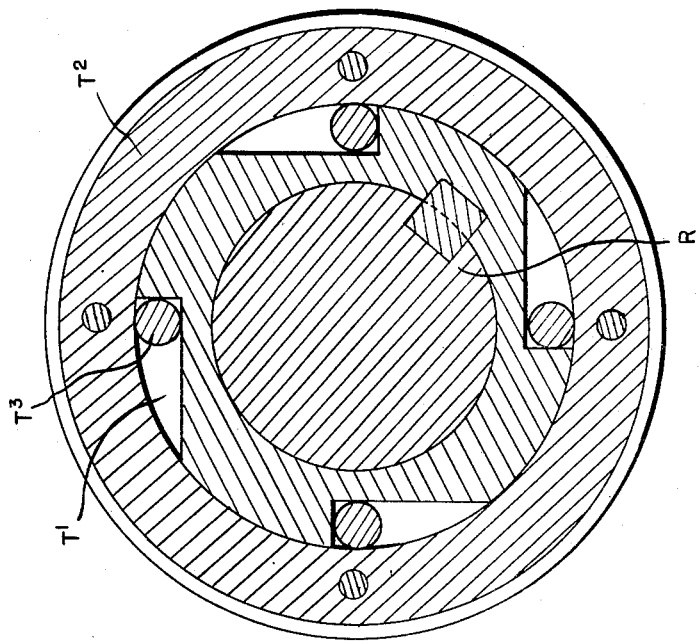

The one-way clutch may be of any suitable construction but as shown in Figs. 6 and 7 T is a member fixed to the shaft R which is provided with a series of recesses T' in its periphery having bottom portions at an angle to the radius. $T^2$ is an annular member surrounding the member T and freely revoluble thereon. $T^3$ are rollers in each of the recesses T', which when the member T is rotated in one direction will wedge against the member $T^2$ to effect the clutching but when rotated in the opposite direction will permit free-wheeling of said member $T^2$. $T^4$ is a sprocket mounted on an extension of the member $T^2$ and which engages a sprocket chain $T^5$ also engaging a sprocket $T^6$ on the shaft of the drum I.

What I claim as my invention is:

1. In a heat treating furnace, a flexible endless belt conveyor for advancing work through the furnace chamber, drums around which said belt passes, a series of spaced rolls intermediate said drums for supporting the upper portion of said belt on which the work is carried, means for simultaneously rotating all of said rolls at equal velocity to frictionally drive said belt when under sufficient load at a multiplicity of spaced points, thereby reducing tension in said belt at any one point, means for rotating the drum at the work discharge end of said belt at a peripheral velocity slightly less than that of said rolls to assist in driving said belt at lower speed, when through lack of work load some slippage on the rolls may occur, and a one way clutch in said means for rotating said drum permitting free overrunning of said drum when said belt is driven by said rolls at higher speed.

2. The construction as in claim 1 in which the greater part of the return portion of the belt is supported on the bottom of the furnace chamber.

3. The construction as in claim 2 provided with means for moving the drum at the work receiving end of the belt outward under variable pressure limited to place on the belt only the minimum tension required for propelling the same when relieved of work load.

4. The construction as in claim 2 in which spaced rolls support the return portion of the belt on the bottom of the furnace chamber.

5. The construction as in claim 4 in which the rolls supporting the return portion of the belt are driven.

6. The construction as in claim 2 in which said rolls have end portions extending out through the furnace wall with sprockets thereon, a driving jack-shaft, a sprocket and chain connection between said jack-shaft and all of said sprockets constituting the driving means therefor, a transmission between said jack-shaft and the driven drum to impart a peripheral velocity to the latter less than that of the rolls, and a one-way clutch in said transmission permitting the overrunning of the drum when the velocity imparted to the belt by the rolls is greater than the driven peripheral velocity of the drum.

References Cited in the file of this patent

UNITED STATES PATENTS

| 1,513,765 | Smith | Nov. 4, 1924 |
| 1,635,861 | Peiler | July 12, 1927 |
| 1,706,501 | Smith | Mar. 26, 1929 |
| 1,894,829 | Otis | Jan. 17, 1933 |
| 2,231,716 | Hansen | Feb. 11, 1941 |

FOREIGN PATENTS

| 416,850 | Great Britain | Sept. 14, 1934 |